United States Patent [19]

Thomas

[11] 4,423,781

[45] Jan. 3, 1984

[54] METHOD OF USING A SPACER SYSTEM IN BRINE COMPLETION OF WELLBORES

[75] Inventor: David C. Thomas, Tulsa, Okla.

[73] Assignee: Standard Oil Company, Chicago, Ill.

[21] Appl. No.: 373,821

[22] Filed: May 3, 1982

Related U.S. Application Data

[63] Continuation of Ser. No. 136,228, Apr. 1, 1980, abandoned.

[51] Int. Cl.³ .................. E21B 21/00; E21B 37/00
[52] U.S. Cl. .......................... 166/312; 252/8.55 R
[58] Field of Search .................. 166/312, 291, 307; 252/8.55 R, 8.55 D

[56] References Cited

U.S. PATENT DOCUMENTS

| | | | |
|---|---|---|---|
| 2,582,909 | 1/1952 | Laurence | 166/291 |
| 2,675,082 | 4/1954 | Hall | 166/285 |
| 2,848,051 | 8/1958 | Williams | 166/291 |
| 3,411,580 | 11/1960 | McKinney et al. | 166/312 X |
| 3,688,845 | 9/1972 | Messenger | 166/291 |
| 3,884,302 | 5/1975 | Messenger | 166/291 |
| 4,108,779 | 8/1978 | Carney | 166/291 X |
| 4,127,174 | 11/1978 | Sharpe et al. | 166/291 |
| 4,141,843 | 2/1979 | Watson | 166/291 X |
| 4,190,110 | 2/1980 | Beirute | 166/291 |
| 4,223,732 | 9/1980 | Carriay et al. | 166/291 |

Primary Examiner—Stephen J. Novosad
Attorney, Agent, or Firm—Scott H. Brown; Fred E. Hook

[57] ABSTRACT

Specification discloses a process for completing a wellbore into a subterranean reservoir. In completing the wellbore, a completion fluid is pumped into the wellbore casing to displace the mud contained therein, the improvement comprising pumping a spacer system into the wellbore casing before pumping the completion fluid into the wellbore. The spacer system comprises a spacer fluid having a viscosity sufficiently high such that the spacer fluid exists in either laminar or plug flow at normal circulation rates.

13 Claims, No Drawings

METHOD OF USING A SPACER SYSTEM IN BRINE COMPLETION OF WELLBORES

This is a continuation, of application Ser. No. 136,228, filed Apr. 1, 1980, now abandoned.

BACKGROUND OF THE INVENTION

1. Field of the Invention

The present invention relates to the completion of wellbores and more particularly relates to a process for placing the completion fluid in the borehole under conditions such that the contamination of the completion fluid with fluids in the wellbore is reduced.

2. Setting of the Invention

In the search for oil and gas, boreholes are drilled deep into the earth. These holes are lined with casing, which is usually heavy steel pipe, and cement is forced down the casing and up the annulus between the outer wall of the casing and the borehole wall. The cement is forced to the bottom of the casing with a displacement fluid, typically drilling mud. The cement and drilling mud are typically separated by a solid plug. Following this cementing procedure and prior to production of the well, the casing must be cleansed of this fluid and production equipment put in place.

Operations to clean out the casing are well-known in the art. Typically, the technique involves lowering a tubing string into the casing, injecting a completion fluid down the annulus between the casing and the tubing to displace and clean the drilling mud from the annulus and to carry the debris out through the tubing to the surface. Contact between the displacing completion fluid and the displaced drilling mud results in a mixture of the two fluids. The mud is separated from the completion fluid at the surface. Typically, the completion fluids contain between 1 and 4 vol % mud after the first circulation. When loaded with this concentration of mud the completion fluid is unsuitable for completion operations.

Typically, the filtration of the completion brine consists of filtration through a 50 micron filter followed by a 10 micron filter. Ideally, the final filtration should be through a 2 micron filter prior to recirculation in the wellbore. However, the high mud concentration (1-4 vol %) in addition to the typical muds used in the cementation step cause the 2 micron filter in addition to the 10 micron filter to cake up and become impassable. If filtration becomes unfeasible, disposal of this type of completion brine creates a problem due to environmental hazards. Accordingly, the need to limit the filtration requirements and to reuse the completion brine is apparent.

3. Prior Art

The present completion techniques include the use of brine or fresh water as a spacer between the mud and the completion fluid. However, this practice is not satisfactory since the annulus is not entirely cleared of mud resulting in completion brine contamination and there is an inherent risk that, due to the reduction in hydrostatic head on the brine or fresh water spacer, a production breakthrough may occur which would be hazardous to surface personnel and equipment. To contain such a breakthrough, packers are placed in the annulus between the tubing and casing. However, breakthroughs can have sufficient pressures which cause these packers to fail.

Prior art in the area of spacer fluid is illustrated by U.S. Pat. No. 4,108,779, Leroy L. Carney, issued Aug. 22, 1978 and entitled, "Oil Well Fluid and Dispersants" which discloses an aqueous hydrocarbon emulsion with solid particulate additives dispersed therein used as an oil well fluid. Specifically, it is used as a spacer or packer fluid for cleaning the annulus between the well casing and the wellbore. The fluid displaces and cleans the annulus of drilling mud and is displaced by cement. This fluid is injected between a drilling mud and cement and would not be useful as a spacer between mud and a completion fluid.

SUMMARY OF THE INVENTION

The present invention is a spacer system and a method of use; the system is useful for effectively separating various types of the completion fluids and drilling mud during completion of a wellbore, and comprises a spacer fluid having a viscosity of about 5 to 400 centipoise and additionally a scrubber fluid and chaser fluid. The system may be designed to allow use with a water-based mud or an oil-based mud.

DETAILED DESCRIPTION OF THE PREFERRED EMBODIMENTS

In a method for completing a wellbore extending into a subterranean formation wherein a completion fluid is pumped into the wellbore annulus between the tubing and casing extending into the wellbore to displace the mud out of the well, the improvement comprising pumping a spacer system into the casing to displace the mud and then pumping the completion fluid into the casing to displace both the spacer system and the mud. The drilling mud, completion fluid, spacer system and mixtures thereof are recovered at the surface. The drilling mud and spacer system are disposed of and the completion fluid plus mixtures of fluids containing completions fluids are retained, filtered and recirculated in the tubing and annulus until the wellbore annulus is sufficiently clean for commencement of production.

The spacer system of this invention should be compatible with water-based muds, including lignosulfonate and polymeric types, and oil-based muds. The term "compatible" as used throughout shall mean that the contiguous fluids do not cause degradation or alteration of the properties such as rheology, etc. of the other fluid.

Spacer systems of this invention should also be compatible with types of completion fluid commonly used in oil well completion and should not significantly affect the completion fluid viscosity. Common completion fluids include solutions of salts that are highly water soluble, stable, high density and non-reactive with other solution components of the formation. The high density of the fluid is used to control pressure differential during production in the annulus and tubing. Suitable salts include: calcium chloride, potassium chloride, sodium bromide, sodium chloride, mixtures of calcium chloride and calcium bromide, and mixtures of zinc bromide, calcium bromide, and calcium chloride.

The spacer system comprises a spacer fluid and preferably comprises a spacer fluid preceded by a scrubber fluid and followed by a chase spacer. The spacer fluid is made up of a solvent and viscosifier. The solvent may be an aqueous or hydrocarbon solvent. The term "aqueous solvent" includes, but is not limited to, fresh, salt and sea water and may include a saturated calcium chloride solution. The term "hydrocarbon solvent"

includes, but is not limited to, kerosene and diesel. If a water-based mud is being displaced, an aqueous solvent is preferred as the solvent. If an oil-based mud is being displaced, a hydrocarbon solvent is preferred.

Preferably, the spacer fluid comprising sufficient amounts of the viscosifier to have a viscosity sufficiently high such that the spacer fliuid exists in laminar or plug flow under normal circulation rates but not exceeding a viscosity such that the spacer fluid is pumpable, the viscosity in general being between about 5 and 400 centipoise. The term "viscosifier" includes any agent that increases viscosity of solvent and produces a spacer fluid which is compatible with the mud and completion fluid. Agents which are useful in this invention include, but are not limited to, colloidal agents such as clays, certain polymers, emulsion forming agents, diatomaceous earth and starches. Suitable clays include kaolins (kaolinite, halloysite, dickite, nacrite, and endellite), bentonites (montmorillonite, beidellite, nontronite, hectorite, and saponite), hydrous micas (bravaisite or illite), attapulgite, sepiolite, and the like. Suitable polymers include carboxylmethyl cellulose, hydroxylmethyl cellulose and the like are useful with aqueous solvents. Consideration in selection of a viscosifier include viscosity to be added, chemical compatibility of the spacer fluid with both the mud and the completion fluid, and ease of filtration to remove solids from the spacer fluid. Preferably the viscosifier is easily flocculated in the completion brine and easily filterable out of the brine. More preferably, the viscosifier for an aqueous solvent is a clay. Most preferably, the viscosifier for an aqueous solvent is an attapulgite clay.

The spacer fluid should be stable in the environment encountered in the casing where temperatures can be greater than 80° C. and pressures can be greater than 35 atm. The fluid, including the viscosifier, is intended to carry with it all the debris and sand remaining in the casing. The spacer fluid should have a very high fluid loss so that the fluid can easily be filtered to remove the mud. Further, the clay used as viscosifier should be easily flocculated from the spacer fluid.

An ideal spacer fluid is a thixotropic colloidal fluid with a gel strength, i.e., a fluid which upon agitation or circulation (as by pumping or otherwise), has a measurable relatively low viscosity and is free flowing (not plastic), particularly at high tempertures; but when such agitation or circulation is halted, the fluid regains its gel strength. The rate of gel formation after agitation is reduced is such that mud and debris contained in the fluid is only permitted to fall a short distance before the gel structure is sufficiently strong to support the mud and debris.

When such spacer fluid having the proper viscosity, the proper gel rate and the proper gel strength is circulated through a casing, it has sufficiently high viscosity to carry the mud and debris from the bottom of the hole to the surface and it has a gel strength such as to allow the mud and debris to settle in a settling pit. On standing in a quiescent state, it develops sufficient gel strength to prevent the settling of the mud and debris in the casing when it becomes necessary to discontinue circulation for any appreciable period of time.

Optionally, a weighting material in an amount effective to impart a density to the spacer fluid so that it has a suitable hydrostatic head to maintain the spacer fluid between the drilling mud and the completion fluid. A variety of conventional weighting materials such as barium sulfate, calcium carbonate, iron oxide, lead oxide, and cement solids for selective adjustment of weight (density) of the spacer over a wide range may be used.

The spacer fluid should be pumped down the casing in amounts and at flow rates such that plug or laminar flow exists in the annulus between the tubing and the casing and that the two mixed portions, i.e., the forward mixing between the mud and the spacer fluid and back mixing between the completion fluid and spacer fluid, of the plug do not mix. The preferred flow rate minimizes front and back mixing and is such that plug flow exists in the annulus between the tubing and the casing.

The scrubber fluid portion of the spacer system comprises a low viscosity solvent. More preferably, the scrubber fluid has a viscosity sufficiently low such that turbulent flow can be achieved during normal rates of circulation of the completion fluids, the viscosity in general being below about 10 centipoise. The scrubber fluid should be compatible with the mud being displaced and the spacer fluid which follows.

Preferably, the low viscosity solvent is selected from a group consisting of aqueous solvent, and hydrocarbon solvent. The terms, "aqueous solvent" and "hydrocarbon solvent" are as defined above for the spacer fluid solvents. If a water based mud is being displaced, fresh water, sea water, or brine water is preferred as the low viscosity solvent. If an oil based mud is being displaced, a hydrocarbon solvent is preferred as the low viscosity solvent.

Preferably, the scrubber fluid of this invention includes additionally a scrubbing agent for scouring the walls of the annulus. Suitable scrubbing agents include abrasive materials such as sand, and surfactants such as detergents. Preferably, the scrubbing agent is sand such as good quality fracturing sand, clean, relatively free of fines and having a U.S. Standard for testing materials' mesh size between about 12 and 60. A scrubbing fluid having about 1 to 10% by volume scrubbing agent is preferred. More preferably, the scrubbing fluid contains about 5% by volume scrubbing agent. The scrubber fluid may be made up of a combination of different low viscosity solvents and scrubbing agents used as a mixture or in sequence.

The scrubber fluid should be pumped down the casing at flow rates such that turbulent flow exists in the annulus between the tubing and the casing and in amounts such that the mixed portions of the contiguous fluids are not mixed.

The chase spacer portion of the spacer system assists the well operator in determining the end of the spacer system thereby affording an opportunity to switch the flow of the circulatory fluids from a collection point for the spacer fluid to a collection point for the completion fluid. The spacer system is discarded and the completion fluid is filtered by conventional filtration means and recirculation in the wellbore until the wellbore is sufficiently cleansed. The chaser spacer should be compatible with both the spacer fluid which precedes it and the completion fluid which displaces it. The chaser spacer preferably comprises one of the following; aqueous calcium chloride solution, sea water and fresh water.

The chase spacer should be pumped down the casing at flow rates such that turbulent flow exists in the annulus between the tubing and the casing and in amounts such that the mixed portions of the contiguous fluids are not mixed.

Preferably, the spacer system comprises from about 5 to about 50 vol % scrubber fluid, from about 25 to about 85 vol % spacer fluid and about 5 to about 50 vol % chase spacer. A more preferred spacer system comprises from about 20 to 30 vol % scrubber fluid, from about 40 to 60 vol % spacer fluid and from about 20 to 30 vol % chase spacer.

The filtration of the separated completion brine can be accomplished by commercially available techniques such as filtration through a coarse filter followed by a fine filter. Preferably, the coarse filter has a mesh size of about 10 microns and the fine filter has a mesh size of about 2 microns.

Although the above description has been given in considerable detail, it is possible to make modifications in the procedure without departing from the spirit and scope of the invention. The following examples illustrate various embodiments of the invention and teach one skilled in the art how to use the invention and various embodiments thereof.

EXAMPLE I

A spacer system was prepared consisting of a spacer fluid containing a mixture of 5 pounds of attapulgite, 390 pounds of barite and 28 gallons of sea water to produce each barrel of spacer fluid, a scrubber fluid containing a mixture of 45 pounds of fracture sand per barrel of fresh water, and a chase spacer containing 0.1 gallons DMS surfactant (manufactured by AquaNess) and 0.25 quarts of Wellaid 840 corrosion inhibitor (manufactured by Amoco Chemical Co.) per barrel of fresh water. A completion fluid was prepared consisting of 40.4 wt % calcium bromide, 14.5 wt % calcium chloride, 6.5 wt % zinc bromide, and 38.6 wt % fresh water.

An 8500 foot well was drilled off the coast of Louisiana, cased and cemented. The cement was displaced into the wellbore by a water-based mud having a density of 16 pounds per gallon. The well tubing diameter was $2\frac{7}{8}$ inches and casing diameter was $7\frac{5}{8}$ inches.

Thirty barrels of scrubber fluid was pumped into the well at 4 bbl/min, followed by 50 barrels of spacer fluid at 4 bbl/min, followed by 20 barrels of chase spacer at 4 bbl/min, and then followed by 262 barrels of completion fluid at a rate of 4 bbl/min.

The scrubber fluid and spacer fluid were discarded as was a portion of the chaser fluid. The completion fluid contained 0.5 vol % mud after the first circulation. The completion fluid was filtered through a 50 micron filter, then through a 10 micron filter and recirculated. After three complete circulations, the fluid contained less than 0.1 vol % mud.

EXAMPLE II

A spacer system was prepared consisting of a scrubbing fluid made up of three parts: the first part was 30 barrels diesel, the second part was 8 drums Wellaid 311 (a detergent manufactured by Amoco Chemical Co.), and the third part was 30 barrels of fresh water injected in sequence, and a spacer fluid comprising 37.8 wt % calcium chloride aqueous solution gelled with Polybrine (a viscosifier manufactured by Dresser Ind. (Magcobar Div.), the spacer fluid having a viscosity of 20–50 centipoise. A completion fluid was prepared consisting of a 37.8 wt % calcium chloride aqueous solution.

An 18,922 foot well was drilled in Louisiana, cased and cemented. The cementing procedure used a water-based mud having a density of 12 pounds per gallon. The wellbore casing diameter was $7\frac{5}{8}$ inches graduated down to 7 inches graduated down to 5 inches. The tubing diameter was $2\frac{7}{8}$ inches graduated down to $2\frac{3}{8}$ inches.

Thirty barrels, 8 drums and 30 barrels of scrubber fluids were pumped into the annulus between the tubing and the casing at a rate of 5 bbl/min, followed by 50 barrels of spacer fluid at a rate of 5 bbl/min, and then followed by 700 barrels of completion fluid at a rate of 5 bbl/min.

The spacer system was discarded. The completion fluid contained 0.1 vol % mud after the first circulation. The completion fluid was filtered through a 10 micron filter and then through a 2 micron filter and then recirculated in the wellbore. After three complete circulations in the wellbore and filtrations, the fluid was clear with no detectable solids.

The results of the Examples show that the spacer system conserves the completion fluid by decreasing substantially the concentration of mud in the completion fluid. The concentration in a typical well completion brine at the end of the first circulation is between 1 and 4 vol %. In the two examples above, the concentration was 0.1 to 0.5 vol % mud, thereby allowing the completion fluid to be recirculated again.

After a limited number of recirculations (2 to 3), the completion fluid is clean enough (less than 0.1% solids or below) to allow completion operations to continue. Using the methods of prior art, up to two days (30–40 circulations) of circulation may be practiced without attaining the fluid cleanliness seen by use of this invention.

We claim:

1. A method for completing a wellbore lined with casing and having cement in the annulus between the outer wall of the casing and the wall of the wellbore wherein a completion fluid is pumped into the casing to displace a fluid out of said casing, which comprises pumping a spacer system into said casing, to displace said fluid before pumping said completion fluid into said casing, said spacer system comprises a spacer fluid compatible with said fluid in said wellbore and having a viscosity such that said spacer fluid exists in laminar or plug flow during said pumping.

2. A method for displacing mud and cement out of the interior of a wellbore lined with casing and having cement in the annulus between the outer wall of the casing and the wall of the wellbore during completion of said wellbore comprising pumping into said casing a spacer system to displace said mud out of said casing and pumping a completion fluid into said casing to displace said spacer system and said mud out of said casing, said spacer system comprising a spacer fluid compatible with said mud and having a viscosity such that said spacer fluid exists in laminar or plug flow during pumping.

3. The method of claims 1 or 2 wherein said spacer fluid has a viscosity of between 5 and 400 centipoise.

4. The method of claim 2 wherein the spacer system additionally comprises a scrubber fluid having a viscosity such that the scrubber fluid is in turbulent flow at normal circulation pumping, said scrubber fluid being pumped into said wellbore before said spacer fluid.

5. The method of claim 4 wherein the method additionally comprises a chase spacer having a viscosity such that chase spacer is in turbulent flow at normal circulating pumping, said chase spacer being pumped into said casing after said spacer fluid.

6. The method of claim 5 wherein said chase spacer is selected from the group consisting of aqueous calcium chloride solution, sea water and fresh water.

7. The method of claim 4, wherein said scrubber fluid comprises a low viscosity solvent selected from a group consisting of aqueous solvent and hydrocarbon solvent.

8. The method of claim 7, wherein said scrubber fluid comprises additionally a scrubbing agent, said agent being fracture sand.

9. The method of claim 4 wherein said wellbore is provided with a casing string and a tubing string suspended therein and said scrubber fluid is pumped down said casing string at a flow rate such that tubulent flow exists in the annulus between said tubing string and said casing string.

10. The method of claims 1 or 2 wherein said spacer fluid comprises a solvent and viscosifier.

11. The method of claim 10 wherein said viscosifier is a clay.

12. The method of claim 11 wherein said viscosifier is attapulgite.

13. The method of claims 1 or 2 wherein said wellbore is provided with a casing string and a tubing string suspended therein and said spacer fluid is pumped down said casing string at a flow rate such that plug flow exists in the annulus between said tubing string and said casing string.

* * * * *